(12) United States Patent
Zhdanovich et al.

(10) Patent No.: US 9,146,939 B1
(45) Date of Patent: Sep. 29, 2015

(54) GENERATING AND USING RESULT SUGGEST BOOST FACTORS

(75) Inventors: Matsvei Zhdanovich, Zurich (CH); Ivan Zauharodneu, Zurich (CH)

(73) Assignee: GOOGLE INC., Mountain View, CA (US)

( * ) Notice: Subject to any disclaimer, the term of this patent is extended or adjusted under 35 U.S.C. 154(b) by 314 days.

(21) Appl. No.: 13/250,264

(22) Filed: Sep. 30, 2011

(51) Int. Cl.
*G06F 7/00* (2006.01)
*G06F 17/30* (2006.01)

(52) U.S. Cl.
CPC .... *G06F 17/30241* (2013.01); *G06F 17/30277* (2013.01)

(58) Field of Classification Search
CPC ............. G06F 17/30241; G06F 17/30277; G06F 17/30554
USPC .......................................................... 707/724
See application file for complete search history.

(56) References Cited

U.S. PATENT DOCUMENTS

| | | | |
|---|---|---|---|
| 7,966,321 B2 * | 6/2011 | Wolosin et al. ............... 707/728 |
| 8,489,641 B1 * | 7/2013 | Seefeld et al. ................ 707/792 |
| 8,745,168 B1 * | 6/2014 | Singleton et al. ............ 709/219 |
| 2003/0115200 A1 * | 6/2003 | Anthony et al. ............... 707/10 |
| 2006/0271280 A1 * | 11/2006 | O'Clair ......................... 701/208 |
| 2007/0028219 A1 * | 2/2007 | Miller et al. .................. 717/124 |
| 2008/0172374 A1 * | 7/2008 | Wolosin et al. .................. 707/5 |
| 2008/0183377 A1 * | 7/2008 | O'Clair ......................... 701/200 |
| 2008/0244429 A1 * | 10/2008 | Stading .......................... 715/764 |
| 2009/0005968 A1 * | 1/2009 | Vengroff et al. .............. 701/202 |
| 2009/0055355 A1 * | 2/2009 | Brunner et al. .................... 707/3 |
| 2009/0132953 A1 * | 5/2009 | Reed et al. ..................... 715/781 |
| 2009/0249198 A1 * | 10/2009 | Davis et al. .................... 715/261 |
| 2010/0094548 A1 * | 4/2010 | Tadman et al. ................ 701/209 |
| 2010/0198495 A1 * | 8/2010 | O'Clair ......................... 701/200 |
| 2010/0306249 A1 * | 12/2010 | Hill et al. ....................... 707/769 |
| 2011/0045840 A1 * | 2/2011 | Alizadeh-Shabdiz et al. ........................... 455/456.1 |
| 2011/0119257 A1 * | 5/2011 | Rajasekhar ................... 707/723 |
| 2011/0131241 A1 * | 6/2011 | Petrou et al. .................. 707/770 |
| 2011/0145228 A1 * | 6/2011 | Laurenzo et al. ............ 707/723 |
| 2011/0282857 A1 * | 11/2011 | Bennett ........................ 707/706 |
| 2011/0306359 A1 * | 12/2011 | Alizadeh-Shabdiz et al. ........................... 455/456.1 |
| 2011/0320487 A1 * | 12/2011 | Ghanea-Hercock .......... 707/769 |
| 2012/0029910 A1 * | 2/2012 | Medlock et al. .................. 704/9 |
| 2012/0127130 A1 * | 5/2012 | Jung ............................. 345/178 |
| 2012/0159371 A1 * | 6/2012 | Thrapp et al. ................. 715/772 |
| 2012/0278171 A1 * | 11/2012 | Tang et al. ................. 705/14.57 |
| 2012/0284247 A1 * | 11/2012 | Jiang et al. .................... 707/706 |
| 2013/0054370 A1 * | 2/2013 | Lehmann ................... 705/14.58 |

* cited by examiner

*Primary Examiner* — Rehana Perveen
*Assistant Examiner* — Mark E Hershley
(74) *Attorney, Agent, or Firm* — Marshall, Gerstein & Borun LLP

(57) ABSTRACT

Search log data may specify map results that were provided to a user, and may further specify, for each map result, a geographic location to which the map result has been identified as relevant. For each geographic location, a number of the search results that have been identified as relevant to the geographic location may be determined, and a result suggest boost factor for the geographic location may be determined based on the number of search results that have been identified as relevant to the geographic location. A result suggest boost factor may be stored in an index, and is a value indicative of a likelihood that a query received from the user is requesting map results that are relevant to the geographic location.

21 Claims, 6 Drawing Sheets

GENERATING AND USING RESULT SUGGEST BOOST FACTORS

BACKGROUND

The subject matter of this specification relates to data processing and result suggestions.

The Internet facilitates access to online geographic data systems (e.g., online maps). These online geographic data systems can provide information about geographic locations and the relationships between the geographic locations. For example, a mapping system may store information about geographic locations, and may allow a user to search for a particular location or locations of interest.

Users can interact with map interfaces that enable them to request presentation of particular portions of a map, and to request information about geographic locations. For example, users can submit search queries through a map interface to request information about locations of businesses or other attractions as well as other information about various geographic locations.

Some mapping systems can provide result suggestions to a user based on partial search input. A result suggestion may include, for example, search results that have been previously generated by the mapping system and provided to users in response to previous queries. The previously generated search results included in the result suggestion may be dynamically displayed to the user as input is received by the mapping system, and may reference geographic locations that relate to the partial search input.

However, existing methods for producing result suggestions may generate and/or provide result suggestions that are over inclusive and/or under inclusive. For example, the result suggestions that are provided to a user may include results that reference geographic locations that are not of interest to the user and/or results that do not reference geographic locations that are of interest to the user.

SUMMARY

In general, one aspect of the subject matter described in this specification can be embodied in a method performed by data processing apparatus that includes receiving search log data for a user, the search log data specifying map results that were provided to the user, the search log data further specifying, for each map result, a geographic location to which the map result has been identified as relevant; and for each geographic location: determining a number of the search results that have been identified as relevant to the geographic location, determining a result suggest boost factor for the geographic location based on the number of search results that have been identified as relevant to the geographic location, the result suggest boost factor being a value indicative of a likelihood that a query received from the user is requesting map results that are relevant to the geographic location, and storing the result suggest boost factor in an index. Other embodiments of this aspect include corresponding system, apparatus, and computer program products.

These and other embodiments can each optionally include, as part of determining the result suggest boost factor for each geographic location, one or more of the following features: receiving, from the index, neighboring result suggest boost factors for one or more neighboring geographic locations, each neighboring geographic location being within a threshold distance of the geographic location; and determining the result suggest boost factor for the geographic location based on the neighboring result suggest boost factors.

In some embodiments, each of the one or more neighboring geographic locations are disjoint subdivisions of a mapped geographic region. In some embodiments, each of the one or more neighboring geographic locations share a geographic location border with the geographic location.

Some embodiments optionally include, as part of determining the result suggest boost factor for the geographic location: for each of the neighboring geographic locations, determining a distance factor for the geographic location, the distance factor being inversely proportional to a distance between the geographic location and the neighboring geographic location; and determining the result suggest boost factor for the geographic location based on the distance factors of each of the neighboring locations.

Some embodiments optionally include, as part of determining the result suggest boost factor for the geographic location: for each of the neighboring geographic locations, determining a time factor for the neighboring geographic location, the time factor being a value that is inversely proportional to an elapsed time since a most recent interaction, by the user, with a map result that references the neighboring geographic location; and determining the result suggest boost factor for the geographic location based on the time factors of each of the neighboring locations.

In general, another aspect of the subject matter described in this specification can be embodied in a method performed by data processing apparatus that includes receiving query data specifying one or more characters that were input into a user interface by the user; obtaining, based on the query data, a set of candidate result suggestions, the candidate result suggestions including the one or more characters, each candidate result suggestion having a result suggest score indicative of a likelihood that the user is inputting a query that matches the candidate result suggestion; and for each of the candidate result suggestions: identifying a geographic location to which the candidate result suggestion has been identified as relevant; selecting, from the index, a result suggest boost factor for the identified geographic location; and adjusting the result suggest score for the candidate result suggestion based on the selected result suggest boost factor.

Other embodiments of these aspects include corresponding systems, apparatus, and computer programs, configured to perform the actions of the methods, encoded on computer storage devices.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
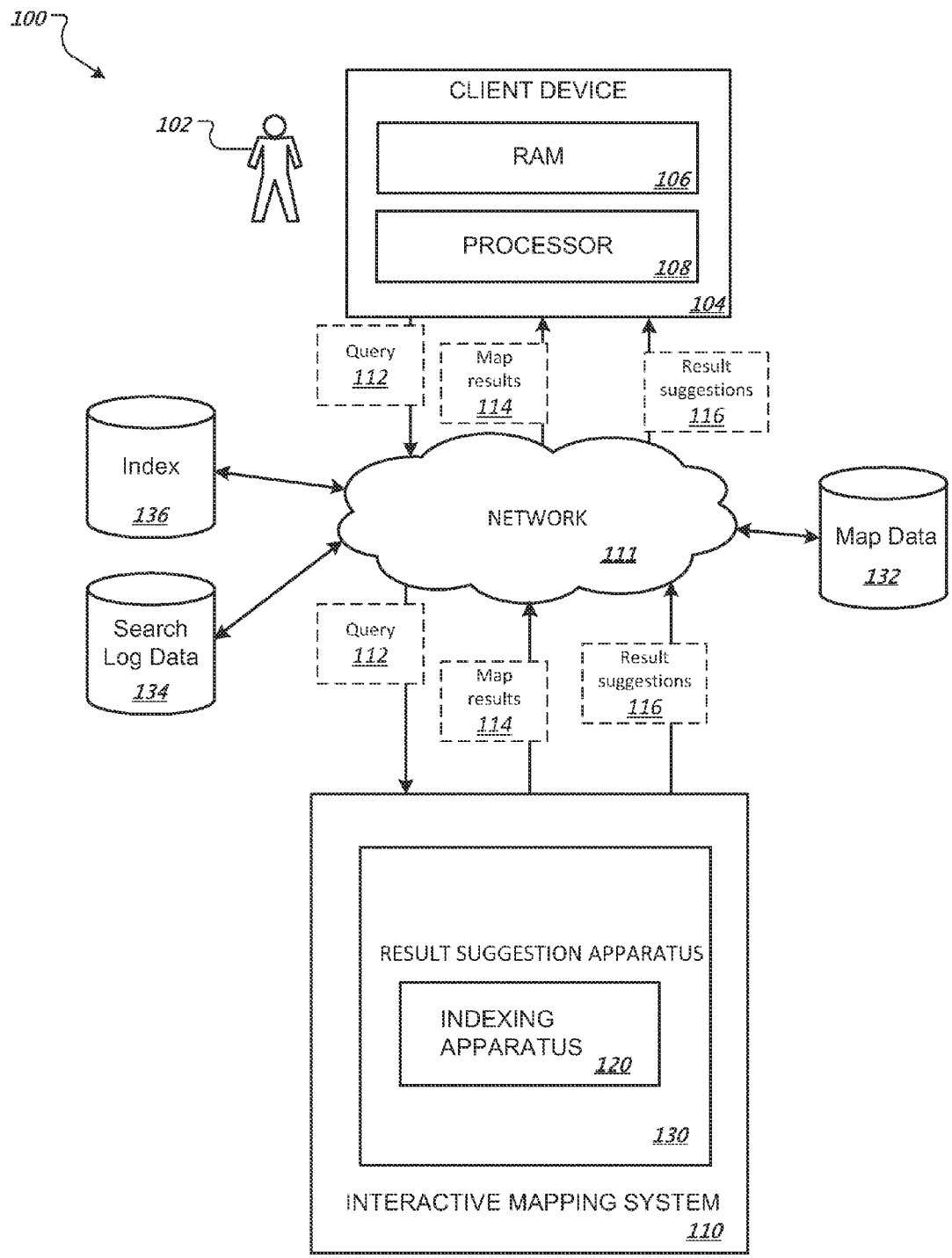
FIG. 1 is a block diagram of an example environment in which an interactive mapping system provides result suggestions.

FIG. 1 is a block diagram of an example environment 100 in which an interactive mapping system 110 provides result suggestions. The example environment 100 includes a network 111, such as a local area network (LAN), a wide area network (WAN), the Internet, or a combination thereof. The network connects client devices 104 with an interactive mapping system 110. As described in more detail below, the interactive mapping system 110 is an example of a geographic data system in which the systems, components, and processes described in this specification can be implemented. The interactive mapping system 110 can be implemented to include one or more computer programs running on one or more computers. In some implementations, the one or more computers are implemented in a distributed computing environment, and can communicate through the network 111 to perform the operations described below.

The client device 104 is an electronic device that is under control of a user 102 and that is capable of requesting and receiving resources over the network 111. The client device 104 can be any kind of data processing apparatus, and can include a random access memory (RAM) 106 and a processor 108. The client device 104 can be, for example, a personal computer, a personal data assistant, a smart phone, a tablet computer, or another device that can send and receive data over the network 111. A client device 104 typically includes a user application, such as a web browser, to facilitate the sending and receiving of data over the network 111. The client device 104 interacts with the interactive mapping system 110 through the network 111.

Using the client device 104, the user 102 can submit a query 112 to the interactive mapping system 110. For example, the user 102 can enter the query 112 into a user interface similar to that described below with reference to FIG. 2. In turn, the query 112 is transmitted by the client device 104 to the interactive mapping system 110. In some implementations, the query 112 is only transmitted by the client device 104 in response to the user taking an action indicating that the query 112 is ready for submission. For example, the query 112 can be transmitted in response to the user 102 interacting with a query submission user interface element or pressing the "enter" key on a keyboard of the client device. Submission data (i.e., data indicating that the user performed a pre-specified action to submit the query) can be included in and/or received with the query 112.

In some implementations, components (e.g., letters and/or phrases) of the query 112 are transmitted by the client device 104 as the components of the query 112 are entered by the user 102. For example, as a user 102 enters the components of query "Public Garden, Boston, Mass.," data representing each of the components can be transmitted by the client device 104 upon entry by the user 102. In this example, data representing each letter of the query "Public Garden, Boston, Mass." can be transmitted to the interactive mapping system 110 as it is entered by the user 102. As used throughout this document, the term "partial query" is used to refer to components of a query that are received by the interactive mapping system 110 prior to receipt of submission data. Continuing with the example above, the phrase "Public Ga" is a partial query for the query "Public Garden, Boston, Mass." As described in more detail below, the interactive mapping system 110 can use partial queries to provide result suggestions 116 to the client device 104.

Upon receipt of the query 112 (or a partial query), the interactive mapping system uses the query 112 to identify map results 114 to provide to the client device 104. A map result 114 is a map-based search result that identifies a map feature (i.e., a feature of a map) that is responsive to a particular query. Examples of map features include locations of natural boundaries (e.g., lakes, rivers, oceans, or mountains), political boundaries (e.g., boundaries that define countries, states, or cities), references to businesses, references to roads, references to landmarks, references to residences, and other map features.

The map result 114 can also include a link to a resource for the map feature. For example, a map result 114 that identifies a business can include a hypertext link to a webpage that is hosted for the business, a hypertext link to a resource that provides user reviews of the business, or a hypertext link to another online resource that includes information about the business.

The interactive mapping system 110 can generate map results 114 using a corpus of map data that is stored in a map data store 132. The map data can be stored in various data structures, such as directed graphs and tries. In some implementations, the interactive mapping system 110 includes an indexing apparatus 120 (a data processing apparatus) that indexes the map data (and/or result suggestion boost factors). The indexing apparatus 120 can index the map data for each map feature according to topics to which the map feature has been identified as relevant. For example, each business that is referenced by the map data can be indexed according to a business category (e.g., restaurant, retail, or tourist attraction).

The indexing apparatus 120 can also index the map data for each map feature according to geographic location. For example, each business that is referenced by the map data can be indexed according to a physical address at which the business is located. The physical address of a business can be identified, for example, from telephone index listings, a webpage for the business, or based on user input. In some implementations, the indexing engine 120 is configured to crawl online resources (e.g., webpages) to identify one or more geographic locations to which each map feature should be indexed. In turn, the indexing apparatus 120 can store, in the map data store 132, the map data representing each map feature with a reference to the one or more geographic locations. The indexing apparatus can be, but need not be implemented in the same data processing apparatus as the result suggestion apparatus.

As used throughout this document a geographic location refers to a pre-specified geographic area (i.e., a portion of a map). The pre-specified geographic area can be selected, for example, based on political boundaries, natural boundaries, and/or other boundaries that can be used to delineate a map. For example, the city of Boston, Mass. can be identified as a geographic location. In this example, the geographic area to which the geographic location Boston refers can include, for example, the geographic area that is within the political boundary that defines the city of Boston. Alternatively, the geographic location Boston can refer to the geographic area that is within a threshold distance of a centroid of Boston. For example, the geographic location Boston can refer to a circular geographic area that is centered at the centroid of Boston and has a radius of 5 miles. In another example, the geographic location Boston can refer to one or more disjoint subdivisions of a map (e.g., non-overlapping map tiles) that include the geographic area that is within the political boundaries that define the city of Boston.

A particular geographic location may be referenced in multiple different ways. For example, the city of Boston, Mass. may be referenced by latitude/longitude coordinate pairs, any of the phrases "Boston," "Boston, Mass.," "Boston, Mass., USA," "Beantown," references to neighborhoods that are in Boston (e.g., "Chinatown"), references to landmarks within Boston, or postal addresses (e.g., zip codes) for Boston. Therefore, the indexing apparatus 120 can be configured to index map data for a particular map feature according to each phrase that references a same geographic location, or to index the map data according to a standardized representation of the geographic location (e.g., Boston_MA_USA) to which the map feature should be indexed.

As noted above, the interactive mapping system 110 uses the map data to generate (or select) map results 114 (i.e., search results for a map environment) that are responsive to the query 112. For example, the interactive mapping system 110 can identify map features having relevance scores that satisfy a relevance threshold (i.e., a minimum specified relevance score), and generate map results 114 that include these identified map features and/or hypertext links to resources (e.g., web pages that include additional information about the map features). The relevance scores can be computed, for example, based at least in part on information retrieval ("IR") scores. The information retrieval scores can be computed from dot products of feature vectors corresponding to the query 112 and feature vectors corresponding to the map features.

The map results can also include, for example, map image data, satellite image data, data identifying locations of popular landmarks, data that specify driving or walking directions between two or more map features. In some implementations, the map results can also include various layers of related data that can be selectively presented. For example, traffic data that are indicative of current traffic conditions can be provided with the map results 114, but may not be presented, for example, until the user 102 interacts with a user interface element that causes presentation of information represented by the traffic data to be displayed with the other map features.

The interactive mapping system 110 can store search logs in a search log data store 134. A search log includes a set of queries that were received from a client device 104. The search log also includes a set of search results that were identified in response to each query. In a map environment, search results can be referred to as map results, and can include map features that were identified as responsive to each of the queries. Thus, the search log data can include data that identify the map features that were identified as responsive to each of the queries. The search log data can further include data identifying the map features with which the user 102 interacted. User interactions with map results that reference a map feature and/or user interactions with hypertext links that are provided with the map results and link to a resource that includes a reference to the map feature both are interchangeably referred to as user interactions with a map feature or user interactions with the map results.

Each map feature that was identified as responsive to a query and/or provided in response to a query can be indexed according to the query for which the map feature was provided. The data identifying the map features with which the user 102 interacted can also be indexed according to the query for which the map feature was provided. As described in more detail below, the search log can be used to facilitate determination of result suggest boost factors for geographic locations.

In some implementations, search log data are only stored for users that have affirmatively agreed to allow storage of search log data. For example, the users for which search log data are stored can be users that have requested that search log data be stored so that the users can be provided with enhanced services that utilize the search log data (e.g., personalized result suggestions). The search log data can be anonymized so that the privacy of users is protected. For example, quasi-unique identifiers can be associated with users, but the actual identifying information of the users is not stored in the search log data. Encryption and obfuscation techniques can also be used to protect the privacy of users.

The interactive mapping system 110 includes a result suggestion apparatus 130 that is configured to provide result suggestions 116 in response to receipt of a partial query (or a complete query). As described above, a result suggestion is data specifying a result that has at least a threshold likelihood of being relevant to a user specified partial query (or complete query). In some implementations, result suggestions are presented to a user as selectable text in response to receipt of a partial query, and selection of a presented result suggestion initiates a search for additional map results. The result suggestion apparatus 130 is illustrated as being a component of the interactive mapping system 110. However, the result suggestion apparatus 130 can also be separately implemented. In such an implementation, the result suggestion apparatus can communicate with the interactive mapping system 110 over the network 111. The description that follows describes result suggestions with reference to partial queries, but result suggestions can also be provided for completed queries.

In some implementations, the result suggestion apparatus 130 selects result suggestions based at least in part on results that have been previously provided to the client device 104. For example, assume that the phrase "Boston Common, Boston, Mass." was previously provided as a map result 114 to the client device 104. In this example, the result suggestion apparatus 130 may select the phrase "Boston Common, Boston, Mass." as a result suggestion in response to receiving the partial query "Bos" from the client device 104. The result suggestion apparatus 130 can also select result suggestions based on a statistical analysis of the relative number of times that each map result is interacted with by users. For example, if users select the map result "Boston Common, Boston, Mass." four times as often as the map result "Public Garden, Boston, Mass.," the result suggestion apparatus 130 may select the phrase "Boston Common, Boston, Mass." as a result suggestion in response to receiving the partial query "Bos" from the client device 104.

In some implementations, the result suggestion apparatus 130 selects multiple result suggestions in response to a partial query. Continuing with the example above, in response to receiving the partial query "Bos" from the client device 104, the result suggestion apparatus 130 may select the phrase "Public Garden, Boston, Mass." as well as the phrase "Boston Common, Boston, Mass." as result suggestions. When more than one result suggestion is provided to the client device 104, the result suggestions can be presented according to a result suggest score. The result suggest score for a result suggestion can be a value indicative of a likelihood that based on the partial query, the result suggestion matches (i.e., is the same as or represents a similar information request as) the query that is being input by the user. Continuing with the example above, when the partial query "Bos" is received from the client device 104, the phrase "Boston Common, Boston, Mass." may have a higher result suggest score than the phrase "Public Garden, Boston, Mass." Thus, result suggestion "Boston Common, Boston, Mass." may be presented higher than the result suggestion "Public Garden, Boston, Mass." in a list of result suggestions that are provided to the client device 104.

The likelihood that a particular result suggestion relates to a query that is being input by the user 102 can depend, for example, on geographic locations of interest to the user 102. The geographic locations that are of interest to the user can be determined, for example, based on an analysis of map results with which the user interacted. The geographic locations that are of interest to the user can also be determined, for example, based on an analysis of queries that were previously received from the client device 104 and/or the map features with which the user 102 interacted.

For example, a user 102 that is gathering information for an upcoming vacation to Las Vegas, Nev. may submit a number of queries that reference Las Vegas and/or interact with many different map features that reference Las Vegas. In this example, analysis of the submitted queries, returned results with which the user interacted, and/or the map features with which the user 102 interacted may indicate that Las Vegas is a geographic location of interest to the user 102. Thus, result suggestions that reference Las Vegas may be more likely to relate to a query that is being input by the user than result suggestions that do not reference Las Vegas.

The result suggestion apparatus 130 is configured to determine result suggest boost factors for geographic locations based on user interactions with map features that reference the geographic location. A result suggest boost factor is a value indicative of a likelihood that the user will submit a query that is relevant to the geographic location. For example, if 80% of the map features with which a user 102 interacted referred to a same particular geographic location, it is likely that the user will request additional information about that particular geographic location, such that result suggestions that are relevant to the particular geographic location are more likely to match the query that is being input by the user 102. In this example, the result suggestion apparatus 130 may select a result suggest boost factor for the particular geographic location that increases the result suggest scores for result suggestions that reference the particular geographic location, such that it is more likely that those result suggestions that reference the particular geographic location will be provided in response to receiving a partial query.

As described below, the result suggestion apparatus 130 can determine result suggest boost factors on a per-user and per-geographic location basis. The result suggest boost factor for each geographic location can be based on the number of map features that reference the geographic location and with which the user interacted relative to a total number of map features with which the user interacted. For example, assume that a user interacted with 100 different map features, and that 40% of the map features referenced Boston, Mass., and 60% referenced Atlanta, Ga. In this example, the result suggestion boost factor for Atlanta, Ga. may be 1.3, while the result suggestion boost factor for Boston, Mass. may be 1.2. The result suggestion apparatus 130 can also use the result suggest boost factor for a particular location to determine result suggest boost factors for neighboring locations of the particular geographic location, as described in more detail below.

Once result suggest boost factors have been determined, the result suggestion apparatus 130 can store the result suggest boost factors with a user identifier for the user 102 for which the result suggest boost factors were determined. In response to receiving a partial query from the user 102, the result suggestions apparatus 130 can use the stored result suggest boost factors to select result suggestions to provide to the user 102. For example, each result suggestion that has been identified as relevant to Boston, Mass. can be multiplied by (or otherwise adjusted using) the query boost factor for Boston (e.g., 1.2), while each result suggestion that has been identified as relevant to Atlanta, Ga. can be multiplied by (or otherwise adjusted using) the query boost factor for Atlanta (e.g., 1.3).

A user interface in which a user can submit queries and receive result suggestions is described with reference to FIG. 2. The generation of result suggest boost factors for a particular location and neighboring locations is described with reference to FIGS. 3A and 3B, and processes for generating result suggest boost factors are described with reference to FIGS. 4 and 5.

Figure 2:
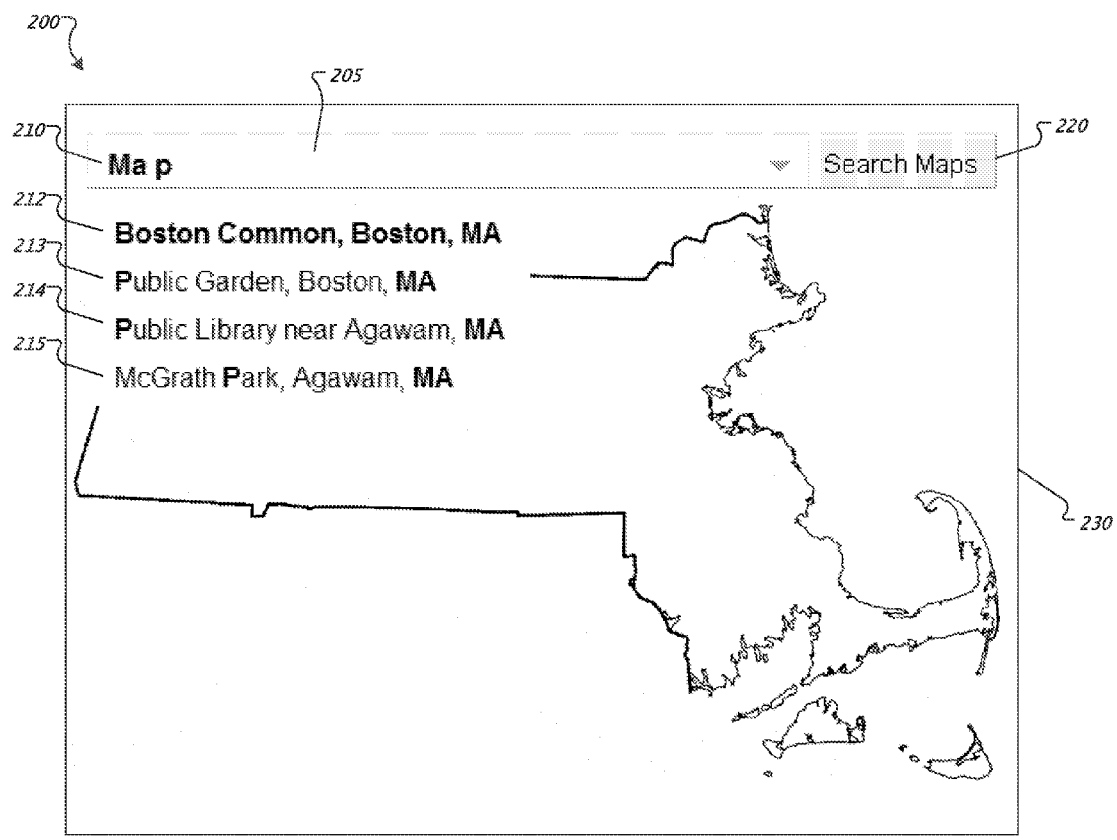
FIG. 2 is a diagram of an example Graphical User Interface for an interactive mapping system.

FIG. 2 is a diagram of an example Graphical User Interface (GUI) 200 for an interactive mapping system, such as system 110, described above. Users of the system can search for map features by submitting queries using the GUI 200. In response to received queries, the interactive mapping system provides map results. The interactive mapping system may, for example, provide map results in the form of text, map images, hypertext links, and related data.

Using a client device, such as client device 104 described above, a user of the interactive mapping system can enter text 210 into a query box 205. By interacting with (e.g., clicking) a submit button 220, which is an example of a query submission user interface element, the user can submit the text and/or submission data to the interactive mapping system.

The interactive mapping system receives the text, retrieves map data using the text, and generates map results using the map data, as described above. The interactive mapping system provides the map results, to client device, for presentation in the GUI 200. The interactive mapping system can also provide data that cause presentation in the GUI 200 of an interactive map portion in which one or more geographic locations are represented.

In some implementations, the interactive mapping system retrieves map data based on the received text and relevance scores associated with specific map features. For example, as described above, the interactive mapping system 110 can identify map features having relevance scores that satisfy a relevance threshold (e.g., a minimum specified relevance score), and can generate map results 114 that include these identified map features. Alternately or additionally, the interactive mapping system can rank map features by relevance score, and can generate a pre-specified number (e.g., a limited number) of map results 114, the generated map results including the highest ranked map features.

The relevance score of a specific map feature may be determined based in part on the specificity of the feature. For example, the city of Boston is more specific than the state of Massachusetts, which is more specific than the United States of America. As such, if interactive mapping system 110 receives the text "Bos" from the client device 104, a component of the relevance score associated with the city of Boston that is based on specificity would be higher than the specificity component of the relevance score associated with the state of Massachusetts, which in turn would be higher than the specificity component of the relevance score associated with the United States of America. Thus, in this example, map features that are associated with the city Boston would have higher specificity components than map features that were associated with Massachusetts, but not Boston.

The relevance score associated with each particular map feature may also be boosted on a per-user basis. For example, the relevance score for a particular map feature can be boosted (e.g., increased or decreased) based on (e.g., in proportion to) the number of map features that reference the particular map feature and with which the user has previously interacted, relative to a total number of map features with which the user previously interacted.

After identifying map features having relevance scores that satisfy the relevance threshold, and/or after identifying a pre-specified number of high-ranking map features, interactive mapping system 110 can generate map results 114 that include these identified map features, and can provide the generated map results to the client device, for presentation in the GUI 200.

Result suggestions can also be presented in the GUI 200. In some implementations, the interactive mapping system can identify result suggestions based on a partial query, and provide data that cause presentation of the identified result suggestions, such as result suggestions 212, 213, 214, and 215, in the GUI 200. For example, using the partial query "MA P" that was received through the GUI 200, the interactive mapping system may provide data that cause presentation of the result suggestion 213 ("Public Garden, Boston, Mass."), which includes each of the characters that were entered into the GUI 200 and, therefore, may match the query ("Ma public garden") that was being input by the user (e.g., as determined based on the text that has already been input ("Ma p")). Multiple result suggestions can be identified for a partial query, such that multiple different result suggestions can be presented in the GUI 200.

As illustrated by FIG. 2, the result suggestions that are selected by the interactive mapping system and/or presented in the GUI 200 can also include result suggestions that expand expected results by suggesting features that reference a geographic location that is relevant to the query. For example, in FIG. 2, the interactive mapping system has provided the phrase "Public Library near Agawam, Mass." as the result suggestion 214. Result suggestions that expand expected results by suggesting features are referred to as "suggestions expansions.". Suggestions expansions can be provided in response to a partial query, for example, when the expanded result suggestion is likely to be relevant to the user's informational need. For example, a historical analysis of search log data may indicate that most users that enter the letters "MA P" as a search phrase have interacted with a statistically relevant portion of the map features that referenced Agawam, Mass. Thus, the result suggestion "Public Library near Agawam, Mass." may be a relevant result suggestion.

As is described in additional detail below, the interactive mapping system may respond to partial queries or complete queries that are received from client device 104 by obtaining, based on the search input data, a set of candidate result suggestions based on result suggest scores (i.e., scores that are indicative of a likelihood that the candidate result suggestions are relevant to the user's informational need). For each of the candidate result suggestions, the interactive mapping system may then identify a geographic location that is relevant to the candidate result suggestion and adjust the result suggest score for the candidate result suggestion based on a result suggest boost factor for the geographic location. The interactive mapping system may then provide, based on the adjusted result suggest scores, result suggestions to the client device.

Figure 3A:
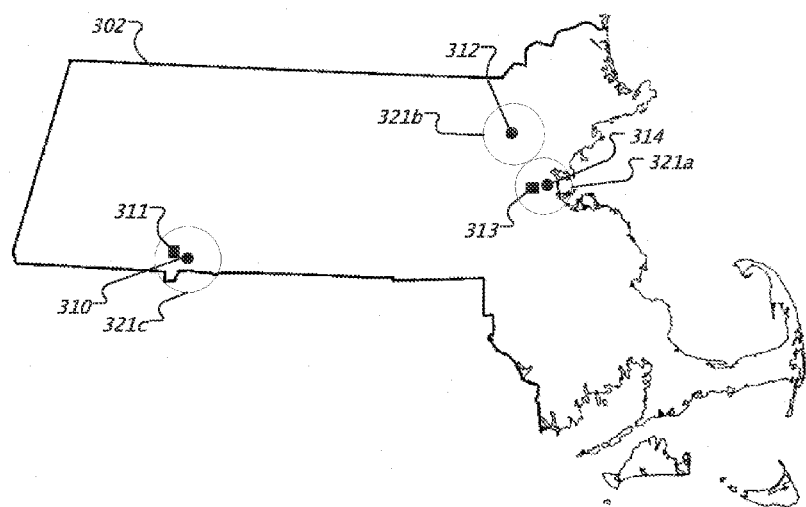
FIGS. 3A and 3B are illustrations of a geographic region that includes multiple different geographic locations for which result suggest boost factors can be determined.
Figure 3B:
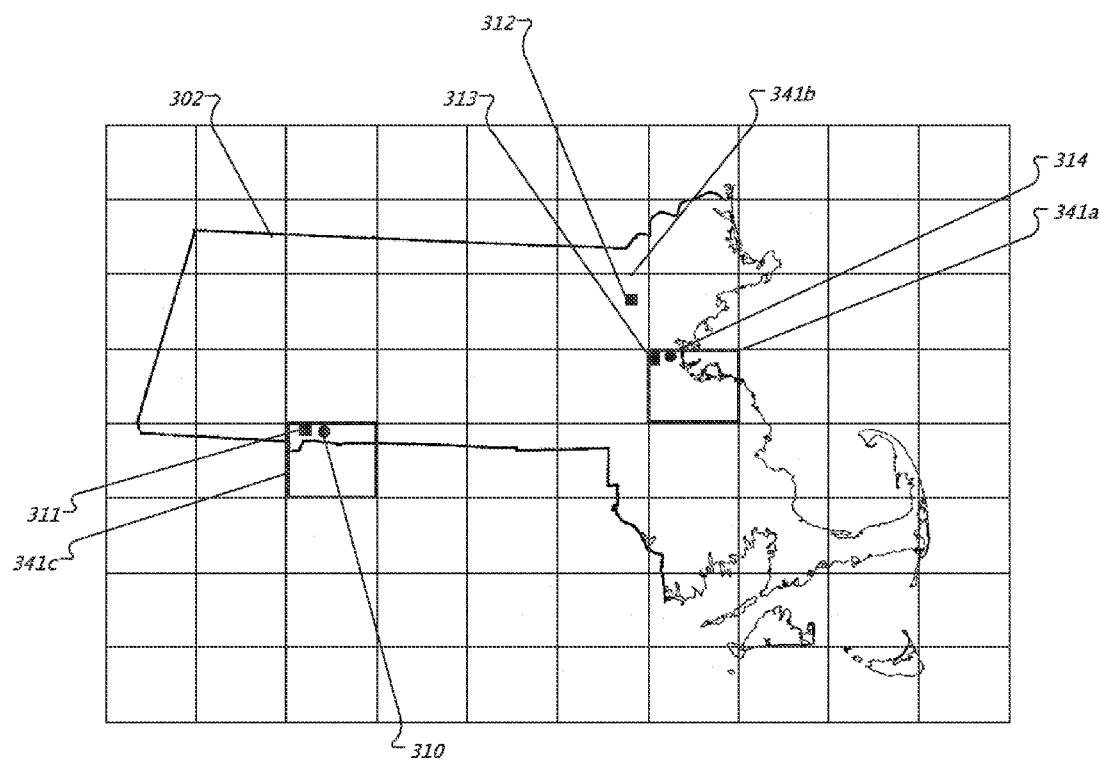

FIGS. 3A and 3B are illustrations of a geographic region 302 that includes multiple different geographic locations for which result suggest boost factors can be determined. Referring to FIG. 3A, the geographic region 302 is defined by the political boundaries for the state of Massachusetts. The geographic region 302 includes three example geographic locations that include the geographic areas that are respectively enclosed by the circles 321a, 321b, and 321c. Three geographic locations are provided for purposes of example, but the geographic region 302 can include additional geographic locations.

The geographic location 321a is centered at the centroid of the city of Boston, Mass. 314, and includes the geographic area that is within a threshold radius of the centroid of Boston, as illustrated by the circle 321a. The city of Cambridge, Mass. 313 is also inside of the circle 321a, such that both the city of Cambridge 313 and the city of Boston 314 are considered to be in the same geographic location for purposes of this example. Thus, as described in more detail below, user interactions with map features that reference Boston 314, user interactions with map features that reference Cambridge 313, and user interactions with map features that reference other locations within the circle 321a will be used to determine the result suggest boost factor for the geographic location 321a.

The geographic location 321b is centered at the centroid of the city of Lowell, Mass. 312, and includes the geographic area that is within a threshold radius of the centroid of Lowell 312, as illustrated by the circle 321b. Thus, user interactions with map features that reference Lowell 312 or other locations inside of the circle 321b will be used to determine the result suggest boost factor for the geographic location 321b.

The geographic location 321c is centered at the centroid of the city of Springfield, Mass. 310 and includes the geographic area that is within a threshold radius of the centroid of Springfield 310. The city of Agawam, Mass. 311 is inside of the circle 321c, such that user interactions with map features that reference Springfield, user interactions with map features that reference Agawam, and user interactions with map features that reference other locations within the circle 321c will be used to determine the result suggest boost factor for the geographic location 321c.

In some implementations, the geographic location 321b and/or the geographic location 321c can be identified as neighboring geographic locations for the geographic location 321a. A neighboring geographic location is a geographic location that is within a threshold distance of a particular geographic location. For example, the geographic location 321b of FIG. 3A may be identified as a neighboring geographic location for the geographic location 321a because the image of the geographic location 321b is adjacent to the edge of the geographic location 321a. Depending on the threshold distance that is selected, the geographic location 321c can also be identified as a neighboring geographic location for the geographic location 321a. For example, assume that the threshold distance for identifying neighboring locations is selected such that all geographic locations that are within the state of Massachusetts are eligible to be neighboring geographic locations for all other geographic locations that are also within the state of Massachusetts. In this example, the geographic location 321c would be a neighboring geographic location for the geographic location 321a even though the geographic location 321a and 321c are separated by a substantial distance.

The result suggest boost factor for a particular geographic location (e.g., 321a) can be based, at least in part, on the result suggest boost factors for neighboring geographic locations (e.g., 321b). In some implementations, the result suggest boost factor for the geographic location 321a can be adjusted based on the result suggest boost factor for the geographic location 321b.

For example, assume that the result suggest boost factor for the geographic location 321a, as determined based on the number of user interactions with map features that reference the geographic location 321a, is 1. Also assume that the result suggest boost factor for the geographic location 321b is 1.5.

In this example, the fact that the geographic locations 321a and 321b each have a result suggest boost factor that is greater than 1.0 indicates that the user has interacted with a significant amount of map features that reference each of the geographic locations 321 and 321b. Thus, it is even more likely that the user will enter future queries with the intent of obtaining additional information related to one of the two geographic locations 321a and 321b. Accordingly, it may be advantageous to increase the boost factors for the geographic locations 321a and 321b in order to further increase the likelihood that result suggestions that are relevant to the geographic locations 321a and/or 321b are selected to be provided in response to a partial query.

In some implementations, the result suggest boost factor for a particular geographic location can be increased in proportion to the result suggest boost factor for the neighboring geographic location. For example, the result suggest boost factor for the particular geographic location may be increased by multiplying the result suggest boost factor for the particular geographic location and the result suggest boost factor for the neighboring location. Other functions can be used to increase the result suggest boost factor for the particular geographic location when the neighboring location has at least a threshold result suggest boost factor.

The contribution of a neighboring result suggest boost factor to the result suggest boost factor for the particular geographic location can be scaled, for example, based on a distance between the particular geographic location and the neighboring geographic location. For example, the amount by which the result suggest boost factor for the particular geographic location is increased by the result suggest boost factor for the neighboring geographic location can be scaled using a distance factor that is inversely proportional to the distance between the particular geographic location and the neighboring geographic location. When the distance factor is used to compute the result suggest boost factor for the geographic location 321a, the contribution of the result suggest boost factor for geographic location 321c will be scaled more than the result suggest boost factor for the geographic location 321b, since the distance between the geographic location 321c and geographic location 321a is greater than the distance between the geographic location 321b and geographic location 321a.

FIG. 3B illustrates an alternative manner in which the geographic region 302 can be delineated into geographic locations. In FIG. 3B, each of the squares represent a different geographic location (e.g., 341a, 341b, and 341c) and include disjoint subsets of the geographic region 302. A result suggest boost can be computed for each of the geographic locations (e.g., 341a, 341b, and 341c), in a manner similar to that described below with reference to FIG. 4. For example, the result suggest boost factor for the geographic location 341a can be computed based on a number of map results (or other search results) that reference the geographic location 341a and with which the user interacted. A map result (or another search result) can be considered to reference the geographic location 341a when the map result includes a reference to a postal address, geographic coordinates, or landmarks that are located in the square that bounds the geographic location 341a.

In some implementations, the geographic region 302 can be delineated using, for example, smaller squares (or other shapes), such that a single city (e.g., the city of Boston) is delineated into multiple geographic locations. In this example, a particular geographic location can be represented by a set of different squares, and a single result suggest boost factor can be computed for the set of different squares. As another example, a particular geographic location can be represented by a set of squares that are organized hierarchically such that a larger square can include a plurality of smaller squares. In this example, a result suggest boost factor can be computed for the larger square based in part on the result suggest boost factors of each of the smaller squares included within the larger square. Alternatively, an independent result suggest boost factor can be computed for each of the different squares.

Figure 4:
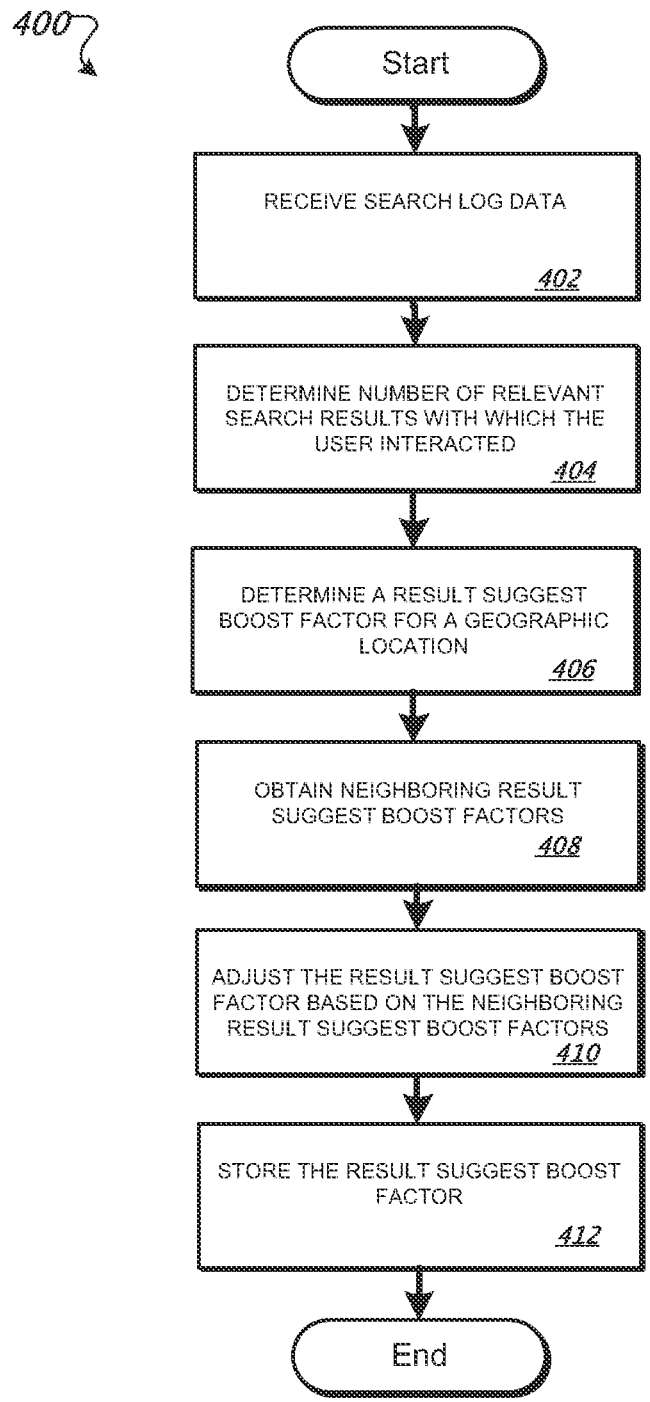
FIG. 4 is a flowchart of example process for generating result suggest boost factors.

FIG. 4 is a flowchart of example process 400 for generating result suggest boost factors. In some implementations, the process 400 can be used to generate result suggest boost factors on a per-user basis, such that result suggest boost factors for a particular user are indicative of geographic search preferences for that particular user. For example, if a particular user interacts with map results that reference one particular geographic location much more often than that particular user interacts with map results that reference other geographic locations, it is more likely that the particular user prefers map results that reference the one particular geographic location. The particular user's search preferences can change over time, such that the process 400 can be periodically or continually performed so that result suggestions that are provided to the user are selected using updated result suggest boost factors.

The process 400 may be implemented, for example, using the interactive mapping system 110, of FIG. 1. The interactive mapping system 110 may retrieve information involved in the processes, such as a query, from one or more local or remote data processing apparatus, such as a client device. Additionally, the interactive mapping system 110 may interact with other data processing apparatus or data stores to obtain candidate result suggestions and/or initial result suggest scores for the result suggestions. Thus, the interactive mapping system 110 is not required to be configured to compute the initial result suggest scores that are associated with candidate result suggestions. In some implementations, a non-transitory computer-readable medium can be used to store instructions that, upon execution by a processing device, cause the processing device to perform the process 400.

Search log data for a user are received (402). As described above, the search log data are data that specify map results (i.e., search results provided in a map environment) that were provided to the user in response to a query that was received from the user. For example, in response to receiving the query "pizza Boston," map results that reference two different pizza restaurants in the city of Boston can be provided for presentation to the user. In this example, the map results that reference each of the referenced pizza restaurants can be indexed as search log data for the user and the geographic location Boston.

The map results can include textual references to the pizza restaurants. The textual references can be presented, for example, in a sidebar (or at another location) of the map environment. The map results can also include graphical references to the pizza restaurants. For example, the map results that reference the pizza restaurants can include "push-pins" that are presented at the locations on the map at which the pizza restaurants are respectively located. These "push-pins" can be interactive user interface elements that enable a user to request additional information, for example, by interacting with (e.g., clicking, selecting, or hovering a pointer over) the "push-pin."

As described above, the search log data can also include data specifying whether the user interacted with the map results that were provided in response to the query. For example, the search log data can include an interaction field for each of the map results that were provided in response to the query. In this example, the field can be populated with a value of "1" to indicate that the user interacted with the map result, or a value of "0" to indicate that the user did not interact with the map result. In some implementations, each different map feature that references the same map result (e.g., an interactive push-pin and a textual result that reference a same business) can each have a user interaction field that separately indicates whether the user interacted with the respective map feature.

A number of the map results with which the user interacted is determined (404). The number of map results with which the user interacted can be determined on a per-geographic location basis. For example, with reference to FIG. 3A, the number of map results can be separately determined for each of the geographic locations 321a, 321b, and 321c. For each different geographic location, the number of map results can include only those map results with which the user interacted and that reference the geographic location. As described above, a map result can reference a geographic location by including a reference to a postal address, a city, or a landmark that has geographic coordinates that are located within the geographic location. Map results that reference a geographic location are considered to be relevant to the geographic location for purposes of determining a result suggest boost factor for the geographic location.

A result suggest boost factor is determined for the geographic location based on the number of map results with which the user interacted (406). The result suggest boost factor is indicative of a likelihood that a query that is received from the user (e.g., a next query received from the user) is requesting map results that are relevant to the geographic location.

In some implementations, the result suggest boost factor for the geographic location can be a value that is proportional to a relative number of user interactions with map results that have been identified as relevant to the geographic location (e.g., reference the geographic location). For example, the result suggest boost factor can be computed as a ratio of the number of map results that were identified as relevant to the geographic location and with which the user interacted relative to a total number of map results with which the user interacted. To illustrate this example, assume that a user interacted with 100 different map results, and 40 of these map results were identified as being relevant to the geographic location. In this example, the result suggest boost factor can be 1.4 (i.e., 1.0+0.40). The result suggest boost factor can also be determined using other functions (e.g., logarithmic functions, exponential functions, or combinations thereof) of the relative number of user interactions with map results that have been identified as relevant to the geographic location.

In some implementations, a time factor can be used when determining the result suggest boost factor for a geographic location. A time factor is a discount factor that is used to adjust the relative contribution of each user interactions to the result suggest boost factor. The time discount factor can be used, for example, so that user interactions that occurred more recently contribute more to the result suggest boost factor than user interactions that occurred less recently. Thus, the result suggest boost factor that is computed using a time discount factor may enable result suggest boost factors to more quickly reflect changes in a user's geographic search preferences.

For example, assume that during a first week, a user is researching a vacation. During this first week, the increased number of user interactions with map results that are relevant to the vacation destination may cause the result suggest boost factor for the vacation destination to increase. Further assume that the user then begins researching a business trip and interacts with map resources that are relevant to the business destination. In this example, if all of the user interactions are weighted equally (i.e., contribute a same amount to result suggest boost factors) irrespective of the time at which the user interactions occurred, the user may need to interact with a large number of map results that are relevant to the business destination before the result suggest boost factor reflects the user's change in geographic search preference. However, if the user interactions are weighted using a time factor, the result suggest boost factors may more quickly adjust to changes in geographic search preferences.

In some implementations, the time discount factor is a value that is inversely proportional to an elapsed time since a user interaction. For example, a maximum time factor of 1.0 may be selected for all user interactions that occurred within a first time period (e.g., within a most recent 24 hours), such that each of the user interactions that occurred during the first time period will each have a weight of 1.0. In this example, user interactions that occurred during a second time period prior to the first time period (e.g., between 24 to 48 hours ago) may have a reduced time factor (i.e., relative to the maximum time factor) of 0.75, such that each of the user interactions that occurred in the second time period will each have a weight of 0.75, thereby contributing less to the result suggest factor than the user interactions that occurred during the first time period.

As demonstrated above, when the time factor is used to determine the result suggest boost factor, each of the user interactions can be weighted using the time factor that corresponds to the elapsed time since the user interaction, such that the relative contribution of each user interaction to the result suggest boost factor is inversely proportional to the elapsed time since the user interaction.

In some implementations, the result suggest boost factor that has been determined as described above is used as the result suggest boost factor for the geographic location. In these implementations, the result suggest boost factor can be stored, and used to adjust result suggest scores for candidate result suggestions, as described with reference to FIG. 5. In some implementations, the result suggest boost factor can be adjusted based on neighboring result suggest boost factors, as described below.

Neighboring result suggest boost factors are obtained for neighboring geographic locations (408). As described above, neighboring locations for a particular geographic location can be other geographic locations that share a geographic location border with the particular geographic location, or with other geographic locations that are within a threshold distance of the particular geographic location. As described above, the neighboring boost factors can be used to adjust the boost factor for the particular location (410). For example, the result suggest boost factor for the particular location can be increased (or decreased) in proportion to the value of the neighboring result suggest boost factor.

In some implementations, each of the neighboring result suggest boost factors is weighted equally in determining the result suggest boost factor for the particular geographic location. In some implementations, each of the neighboring result suggest boost factors is weighted based on a distance between the neighboring geographic location and the particular geographic location. For example, neighboring result suggest boost factors for neighboring geographic locations that are within a specified distance (e.g., within 20 miles) of the particular geographic location may have a maximum weight (e.g., 1.0), while neighboring result suggest boost factors that outside of the specified distance (e.g., more than 20 mile from the particular geographic location) may have reduced weights relative to the maximum weight. In some implementations, the weight for each of the neighboring result suggest boost factors is inversely proportional to the distance between the neighboring geographic location and the particular geographic location for which the result suggest boost factor is being computed.

Time factors can also be used to adjust the weight of each of the neighboring result suggest boost factors. For example, a time factor similar to that described above can be used to adjust the weight of a neighboring result suggest boost factor based on an elapsed time since the most recent user interaction with a map result that referenced the geographic location.

The result suggest boost factor is stored in an index (412). In some implementations, the result suggest boost factor can be stored in the index 136 of FIG. 1, or another data store. The result suggest boost factor can be indexed, for example, according to the user for which the result suggest boost factor has been determined and/or the geographic location for which the result suggest boost factor was determined. A result suggest boost factor can be computed for each geographic location and stored in the index, such that the index includes result suggest boost factors for each of the geographic locations. The index can be stored with a reference to a user identifier that anonymously identifies the user for which the index was created, such that the index can be referenced when a query is received from the user.

Figure 5:
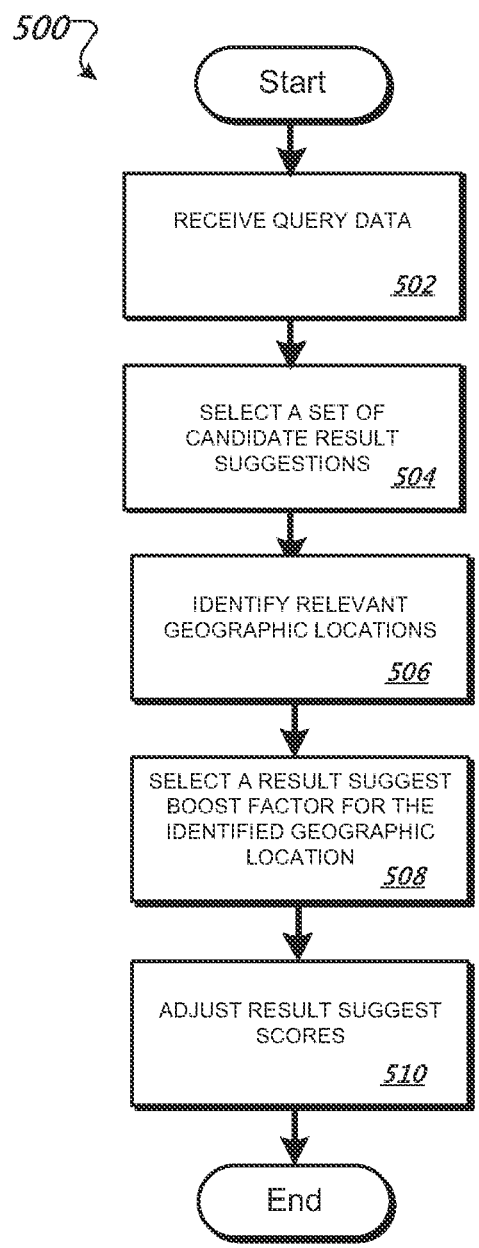
FIG. 5 is a flowchart of an example process for adjusting a result suggest score based on a result boost factor.

FIG. 5 is a flowchart of an example process 500 for adjusting a result suggest score based on query a suggest boost factor. The process 500 may be implemented, for example, using the interactive mapping system 110, of FIG. 1. The interactive mapping system 110 may retrieve information involved in the processes, such as a query, from one or more local or remote data processing apparatus, such as client device. Additionally, the interactive mapping system 110 may interact with other data processing apparatus or data stores to obtain candidate result suggestions and/or initial result suggest scores for the result suggestions. Thus, the interactive mapping system 110 is not required to be configured to compute the initial result suggest scores that are associated with candidate result suggestions. In some implementations, a non-transitory computer-readable medium can be used to store instructions that, upon execution by a processing device, cause the processing device to perform the process 500.

Query data specifying a received query is received (502). The received query can be a partial query or a completed query that was submitted by a client device. As described above with reference to FIG. 1, the query data can specify one or more characters that were input into a user interface (e.g., an interactive map interface) at the client device.

A set of candidate result suggestions are obtained based on the query data (504). In some implementations, the set of candidate result suggestions are result suggestions that have at least a threshold likelihood of being relevant to the query being input at the user interface. For example, the set of candidate result suggestions can include result suggestions that include the one or more characters that were input into the user interface. The set of candidate result suggestions can also include suggestions expansions, as described above. Each of the candidate result suggestions that are obtained can have a corresponding result suggest score. As described above, the result suggest score is indicative of a likelihood that the candidate result suggestion is relevant to the query being input at the user interface.

In some implementations, a retrieval score can be used in combination with query data to determine which results suggestions to obtain. For example, the set of candidate result suggestions may include only result suggestions having a retrieval score that exceeds a threshold. In this example, the retrieval score may be based in part on the user's search log data. In such an implementation, map results that are specified in the user's search log data, or that are otherwise identified as relevant to geographic locations that appear in the user's search log data, can receive a retrieval score boost.

For each of the candidate result suggestions, a geographic location to which the candidate result suggestion is relevant is identified (506). In some implementations, the relevance of a candidate result suggestion to a geographic location can be determined based on a statistical analysis of the map results with which users interact when the candidate result suggestion is provided. For example, if 95% of the users provided with the candidate result suggestion interact with map results that reference a particular geographic location, it is likely that the candidate result suggestion is relevant to the geographic location. A candidate result suggestion can also be identified as relevant to a particular location by including a reference to the geographic location. For example, the candidate result suggestion "Boston Common, Boston, Mass.," can be considered relevant to Boston since the query includes the term Boston.

A result suggest boost factor for the identified geographic location is selected (508). In some implementations, the result suggest boost factor is selected from the index of result suggest boost factors that have been generated for the user. For example, the query data can include an anonymous user identifier that uniquely identifies the user that submitted the query. This anonymous user identifier can be used to locate the index of result suggest boost factors that has been created for the user, and the result suggest boost factor for the identified geographic location can be identified from the index.

The result suggest score for the candidate result suggestion is adjusted based on the selected result suggest boost factor (510). As described above, the adjusted result suggest score can be the result of a function of the result suggest score for the candidate result suggestion and the result suggest boost factor for the geographic location to which the candidate result suggestion was identified as relevant.

Adjusted result suggest scores can be used to select result suggestions to be provided and/or the order in which the result suggestions are presented, as described above.

Figure 6:
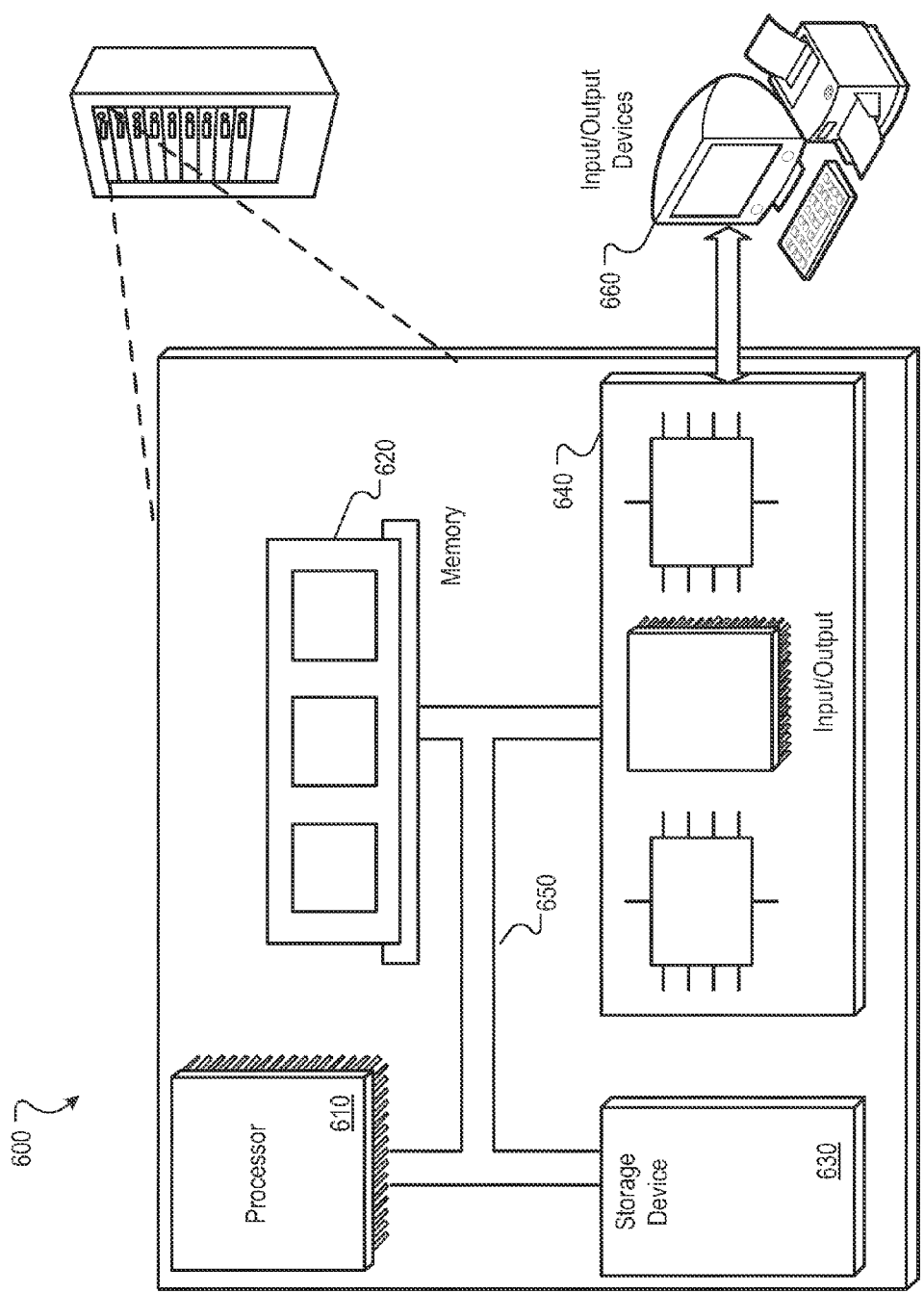
FIG. 6 is a block diagram of an example computer system 600 that can be used to facilitate generation of result suggest boost scores.

FIG. 6 is a block diagram of an example computer system 600 that can be used to facilitate generation of result suggest boost scores. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

The web server and geographical data server can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The web server and geographical data server can be distributively implemented over a network, such as a server farm, or can be implemented in a single computer device.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, a composition of matter effecting a machine readable propagated signal, or a combination of one or more of them.

The terms "processing system" and "data processing apparatus" each encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method performed by data processing apparatus, the method comprising:
receiving search log data for a user, the search log data specifying map results that were provided to the user, the search log data further specifying, for each map result, a geographic location to which the map result has been identified as relevant and an interaction field indicating whether the user interacted with the map result;
for each geographic location:
determining a number of the map results from the search log data that have been identified as relevant to the geographic location and with which the user interacted,
determining a result suggest boost factor for the geographic location based on the number of search results that have been identified as relevant to the geographic location and with which the user interacted, the result suggest boost factor being a value indicative of a likelihood that a query received from the user is requesting map results that are relevant to the geographic location, and
storing the result suggest boost factor in association with the user who generated the search log data;
after storing the result suggest boost factor, receiving a partially-formed query along with an identifier of the user who generated the search log data;
identifying the result suggest boost factor based on the identifier of the user received along with the query;
determining a personalized user-specific and location-specific query completion suggestion based on the partially-formed query and the result suggest boost factor, the user-specific and location-specific query completion suggestion being personalized to the user based on the search log data of that user; and
sending the personalized user-specific and location-specific query completion suggestion in response to receiving the partially-formed query.

2. The method of claim 1, wherein:
storing the result suggest boost factor in association with the user who generated the search log data comprises storing the result suggest boost factor in an index specific to the user; and
determining the result suggest boost factor for the geographic location further comprises:
receiving, from the index, neighboring result suggest boost factors for one or more neighboring geographic locations, each neighboring geographic location being within a threshold distance of the geographic location; and
determining the result suggest boost factor for the geographic location based on the neighboring result suggest boost factors.

3. The method of claim 2, wherein each of the one or more neighboring geographic locations are disjoint subdivisions of a mapped geographic region.

4. The method of claim 2, wherein each of the one or more neighboring geographic locations share a geographic location border with the geographic location.

5. The method of claim 2, wherein determining the result suggest boost factor for the geographic location further comprises:
for each of the neighboring geographic locations, determining a distance factor for the geographic location, the distance factor being inversely proportional to a distance between the geographic location and the neighboring geographic location; and
determining the result suggest boost factor for the geographic location based on the distance factors of each of the neighboring locations.

6. The method of claim 2, wherein determining the result suggest boost factor for the geographic location further comprises:
for each of the neighboring geographic locations, determining a time factor for the neighboring geographic location, the time factor being a value that is inversely proportional to an elapsed time since a most recent interaction, by the user, with a map result that references the neighboring geographic location; and
determining the result suggest boost factor for the geographic location based on the time factors of each of the neighboring locations.

7. The method of claim 1, wherein determining the personalized user-specific and location-specific query completion suggestion comprises:
receiving query data specifying one or more characters that were input into a user interface by the user;
obtaining, based on the query data, a set of candidate result suggestions, the candidate result suggestions including the one or more characters, each candidate result suggestion having a result suggest score indicative of a likelihood that the user is inputting a query that matches the candidate result suggestion; and
for each of the candidate result suggestions:
identifying a geographic location to which the candidate result suggestion has been identified as relevant;
selecting the result suggest boost factor for the identified geographic location; and
adjusting the result suggest score for the candidate result suggestion based on the selected result suggest boost factor.

8. A system, comprising:
one or more data processors; and
a memory coupled to the one or more data processors having instructions stored thereon which, when executed by the one or more data processors cause the one or more data processors to perform operations comprising:
receiving search log data for a user, the search log data specifying map results that were provided to the user, the search log data further specifying, for each map result, a geographic location to which the map result has been identified as relevant and an interaction field indicating whether the user interacted with the map result;
for each geographic location:
determining a number of the map results from the search log data that have been identified as relevant to the geographic location and with which the user interacted,
determining a result suggest boost factor for the geographic location based on the number of search results that have been identified as relevant to the geographic location and with which the user interacted, the result suggest boost factor being a value indicative of a likelihood that a query received from the user is requesting map results that are relevant to the geographic location, and
storing the result suggest boost factor in association with the user who generated the search log data;

after storing the result suggest boost factor, receiving a partially-formed query along with an identifier of the user who generated the search log data;

identifying the result suggest boost factor based on the identifier of the user received along with the query;

determining a personalized user-specific and location-specific query completion suggestion based on the partially-formed query and the result suggest boost factor, the user-specific and location-specific query completion suggestion being personalized to the user based on the search log data of that user; and sending the personalized user-specific and location-specific query completion suggestion in response to receiving the partially-formed query.

9. The system of claim 8, wherein determining the result suggest boost factor for each geographic location further comprises:

receiving neighboring result suggest boost factors for one or more neighboring geographic locations, each neighboring geographic location being within a threshold distance of the geographic location; and determining the result suggest boost factor for the geographic location based on the neighboring result suggest boost factors.

10. The system of claim 9, wherein each of the one or more neighboring geographic locations are disjoint subdivisions of a mapped geographic region.

11. The system of claim 9, wherein each of the one or more neighboring geographic locations share a geographic location border with the geographic location.

12. The system of claim 9, wherein determining the result suggest boost factor for each geographic location further comprises:

for each of the neighboring geographic locations, determining a distance factor for the geographic location, the distance factor being inversely proportional to a distance between the geographic location and the neighboring geographic location; and determining the result suggest boost factor for the geographic location based on the distance factors of each of the neighboring locations.

13. The system of claim 12, wherein determining the result suggest boost factor for each geographic location based on the determined distances further comprises:

for each of the neighboring geographic locations, determining a time factor for the neighboring geographic location, the time factor being a value that is inversely proportional to an elapsed time since a most recent interaction, by the user, with a map result that references the neighboring geographic location; and determining the result suggest boost factor for the geographic location based on the time factors of each of the neighboring locations.

14. The system of claim 9, wherein determining the personalized user-specific and location-specific query completion suggestion comprises:

receiving query data specifying one or more characters that were input into a user interface by the user;

obtaining, based on the query data, a set of candidate result suggestions, the candidate result suggestions including the one or more characters, each candidate result suggestion having a result suggest score indicative of a likelihood that the user is inputting a query that matches the candidate result suggestion; and for each of the candidate result suggestions:
identifying a geographic location to which the candidate result suggestion has been identified as relevant;

selecting a result suggest boost factor for the identified geographic location; and adjusting the result suggest score for the candidate result suggestion based on the selected result suggest boost factor.

15. A non-transitory computer-readable medium storing software comprising instructions executable by a processing device which, upon such execution, cause the processing device to perform operations comprising:

receiving search log data for a user, the search log data specifying map results that were provided to the user, the search log data further specifying, for each map result, a geographic location to which the map result has been identified as relevant and an interaction field indicating whether the user interacted with the map result;

for each geographic location:
determining a number of the map results from the search log data that have been identified as relevant to the geographic location and with which the user interacted, determining a result suggest boost factor for the geographic location based on the number of search results that have been identified as relevant to the geographic location, the result suggest boost factor being a value indicative of a likelihood that a query received from the user is requesting map results that are relevant to the geographic location, and storing the result suggest boost factor in an index associated with the user who generated the search log data;

after storing the result suggest boost factor in the index, receiving a partially-formed query along with an identifier of the user who generated the search log data;

identifying the index based on the identifier of the user;

determining a personalized user-specific and location-specific query completion suggestion based on the partially-formed query and the result suggest boost factor, the user-specific and location-specific query completion suggestion being personalized to the user based on the search log data of that user; and sending the personalized user-specific and location-specific query completion suggestion in response to receiving the partially-formed query.

16. The computer readable medium of claim 15, wherein determining the result suggest boost factor for each geographic location further comprises:

receiving, from the index, neighboring result suggest boost factors for one or more neighboring geographic locations, each neighboring geographic location being within a threshold distance of the geographic location; and determining the result suggest boost factor for the geographic location based on the neighboring result suggest boost factors.

17. The computer readable medium of claim 16, wherein each of the one or more neighboring geographic locations are disjoint subdivisions of a mapped geographic region.

18. The computer readable medium of claim 16, wherein each of the one or more neighboring geographic locations share a geographic location border with the geographic location.

19. The computer readable medium of claim 16, wherein determining the result suggest boost factor for each geographic location based on the determined distances further comprises:

for each of the neighboring geographic locations, determining a distance factor for the geographic location, the distance factor being inversely proportional to a distance between the geographic location and the neighboring geographic location; and determining the result suggest boost factor for the geographic location based on the distance factors of each of the neighboring locations.

20. The computer readable medium of claim 16, wherein determining the result suggest boost factor for each geographic location further comprises:

for each of the neighboring geographic locations, determining a time factor for the neighboring geographic location, the time factor being a value that is inversely proportional to an elapsed time since a most recent interaction, by the user, with a map result that references the neighboring geographic location; and determining the result suggest boost factor for the geographic location based on the time factors of each of the neighboring locations.

21. The computer readable medium of claim 15, wherein determining the personalized user-specific and location-specific query completion suggestion comprises:

receiving query data specifying one or more characters that were input into a user interface by the user;

obtaining, based on the query data, a set of candidate result suggestions, the candidate result suggestions including the one or more characters, each candidate result suggestion having a result suggest score indicative of a likelihood that the user is inputting a query that matches the candidate result suggestion; and for each of the candidate result suggestions:

identifying a geographic location to which the candidate result suggestion has been identified as relevant;

selecting, from the index, a result suggest boost factor for the identified geographic location; and adjusting the result suggest score for the candidate result suggestion based on the selected result suggest boost factor.

\* \* \* \* \*